United States Patent
Meng et al.

(10) Patent No.: US 9,570,016 B2
(45) Date of Patent: Feb. 14, 2017

(54) LIGHT SOURCE CONTROL MODULE, BACKLIGHT MODULE AND DRIVING METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhiming Meng, Beijing (CN); Daekeun Yoon, Beijing (CN); Weihao Hu, Beijing (CN); Zongze He, Beijing (CN); Jianming Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 205 days.

(21) Appl. No.: 14/448,060

(22) Filed: Jul. 31, 2014

(65) Prior Publication Data
US 2015/0235597 A1 Aug. 20, 2015

(30) Foreign Application Priority Data
Feb. 14, 2014 (CN) .......................... 2014 1 0051647

(51) Int. Cl.
G09G 3/36 (2006.01)
G09G 3/34 (2006.01)
(Continued)

(52) U.S. Cl.
CPC .............. *G09G 3/3413* (2013.01); *F21V 9/10* (2013.01); *G02F 1/1336* (2013.01);
(Continued)

(58) Field of Classification Search
CPC combination set(s) only.
See application file for complete search history.

(56) References Cited

U.S. PATENT DOCUMENTS

2011/0007104 A1* 1/2011 Nakazawa ........... G09G 3/3413
345/690

FOREIGN PATENT DOCUMENTS

CN 101083037 A 12/2007
CN 101656853 A 2/2010
(Continued)

OTHER PUBLICATIONS

Notification of the First Office Action dated Jun. 26, 2015 corresponding to Chinese application No. 201410051647.7.

*Primary Examiner* — Jonathan Boyd
*Assistant Examiner* — Sosina Abebe
(74) *Attorney, Agent, or Firm* — Nath, Goldberg & Meyer; Joshua B. Goldberg

(57) ABSTRACT

The present invention provides a light source control module, a backlight module and driving method thereof which can overcome the problems of insufficient color amount, poor performance and lowered color saturation. A light source control module of the present invention is used for separately controlling illumination colors and/or brightness of each light source in the backlight module according to image information. The driving method of the backlight module comprises: calculating representative color and/or brightness of each image section based on image information, wherein each image section corresponds to a light output area on the output surface of the backlight module, each light output area is illuminated by one light source in the backlight module; adjusting the illumination colors and/or brightness of each light source such that the color and/or brightness of each light output area is in conformity with the representative color and/or brightness of corresponding image section.

16 Claims, 3 Drawing Sheets

(51) Int. Cl.
*F21V 9/10* (2006.01)
*G02F 1/1335* (2006.01)

(52) U.S. Cl.
CPC ........ *G09G 3/3426* (2013.01); *F21Y 2113/13* (2016.08); *F21Y 2115/10* (2016.08); *G09G 2320/062* (2013.01); *G09G 2320/0646* (2013.01); *G09G 2360/16* (2013.01)

(56) References Cited

FOREIGN PATENT DOCUMENTS

| | | |
|---|---|---|
| CN | 101714336 A | 5/2010 |
| JP | 2012177770 A | 9/2012 |
| TW | 201303833 A | 1/2013 |

\* cited by examiner

LIGHT SOURCE CONTROL MODULE, BACKLIGHT MODULE AND DRIVING METHOD THEREOF

FIELD OF THE INVENTION

The invention relates to the field of display technology, in particular to a light source control module, a backlight module and driving method of the backlight module.

BACKGROUND OF THE INVENTION

The liquid crystal display device has advantageous such as low power consumption, reduced thickness, no radiation and long lifetime, therefore the application of the liquid crystal display device becomes more and more wide. Typically, a liquid crystal display device mainly include a display panel and a backlight module, wherein the backlight module is used for emitting uniform white light to the display panel, and each pixel of the display panel filters the light from the backlight module to adjust the light transmittance at each pixel, and color filters for different colors are disposed at each pixel, such that light transmitted through each pixel has different colors and together forms a color display.

However, in the liquid crystal display device, the color display is achieved by the color filters filtering the background white light, the illumination brightness throughout the backlight module is uniform, such that the liquid crystal display device has insufficient color amount, poor performance and lowered color saturation.

SUMMARY OF THE INVENTION

Technical problems to be solved by the present invention include that the existing display device has insufficient color amount, poor performance and lowered color saturation. With respect to above problems, the present invention provides a light source control module, a backlight module and driving method thereof which render sufficient color amount, improved performance and better color saturation.

One solution of the present invention provides a light source control module for separately controlling illumination colors and/or brightness of each light source in the backlight module according to image information.

Preferably, the light source control module comprises: an acquiring unit for acquiring image information; a calculating unit, configured to calculate representative color and/or brightness of each image section based on the image information; a control unit for controlling the illumination colors and/or brightness of each light source in the backlight module, according to the representative color and/or brightness of each image section.

Further preferably, the control unit controls the illumination colors and/or brightness of each light source in the backlight module by adjusting current.

One solution of the present invention provides a driving method of the backlight module comprising:

Calculating representative color and/or brightness of each image section based on image information, wherein each image section corresponds to a light output area on the output surface of the backlight module, each light output area is illuminated by one light source in the backlight module;

Adjusting the illumination colors and/or brightness of each light source such that the color and/or brightness of each light output area is in conformity with the representative color and/or brightness of corresponding image section.

Preferably, said calculating representative color and/or brightness of each image section based on image information comprise:

Calculating, according to the following formula, the initial value Lin of respective color component in each image section:

$$L_{in} = \frac{a}{P}\sum_{i=0}^{max}(i \times H_i \times W_i)$$

Wherein a is color coefficient, P is the number of pixels having the color component in each image section, i is a color value, Hi is the number of pixels having the color component and having a color value i in each image section, Wi is a weighting factor for the color value i.

Further preferably, said calculating representative color and/or brightness of each image section based on image information comprise:

Obtaining an enhanced value Lz of respective color component in each image section by enhancing the initial value Lin, wherein the enhanced value Lz is calculated as follows:

$$L_z = \begin{cases} L_{in} & L_{in} \leq L_m \\ L_{in} + b \times (L_{in} - L_m) & L_{in} > L_m \end{cases}$$

Wherein b is the enhancement coefficient, Lm is an average of the initial value Lin of the color component in all image sections.

Further preferably, each light source of the backlight module comprises a plurality of sub-sources having different illumination colors, and the color of each sub-source corresponds to the respective color components.

Preferably, said calculating representative color and/or brightness of each image section based on image information comprise: comparing the representative color and/or brightness of respective image section with that of adjacent image section, and adjusting the representative color and/or brightness of the image section based on comparison result.

Preferably, said calculating representative color and/or brightness of each image section based on image information comprise: comparing the representative color and/or brightness of respective image section with that of the same image section in adjacent image frames, and adjusting the representative color and/or brightness of the image section based on comparison result.

One solution of the present invention provides a backlight module comprising:
a plurality of light sources, the illumination color and/or brightness of each light source is adjustable; and
a light source control module mentioned above.

Preferably, each of the light sources comprises a plurality of sub-sources having different luminescent colors.

Further preferably, said sub-sources are light emitting diodes.

REFERENCE NUMERALS

1. Light source; 11. Lead pins; R. red LED; G. green LED; B. blue LED; 2. Light guide plate; 3. Diffuser plate; 9. Light output area.

DETAILED DESCRIPTION OF THE EMBODIMENTS

To make a person skilled in the art better understand the technical solution of the present invention, the present invention will be further described below in details in conjunction with accompanying drawings and specific implementations.

Embodiment 1

As shown in FIGS. 1-5, the present embodiment provided a light source control module, a backlight module in which the light source control module is applied, and a driving method of the backlight module.

The light source control module is used for controlling illumination colors and/or brightness of each light source in the backlight module separately according to image information.

That is, the light source control module is used for controlling the light sources of the backlight module in the LCD device, and is different from existing light source control module in that, the respective light sources are controlled in an independent manner according to the image to be displayed. The color and/or brightness of light output from different positions on the backlight module is in conformity with the contents in respective areas of the image to be displayed, such that the colors of the image are improved, the color amount is increased, color performance and color saturation are improved.

Preferably, the light source control module comprises:

An acquiring unit for acquiring image information, which can receive contents of the image to be displayed from video card and the like.

A calculating unit configured to calculate representative color and/or brightness of each image section based on the image information. Specifically, the acquiring unit and the calculating unit may be integrated using Field Programmable Gate Array (FPGA).

A control unit for controlling the illumination colors and/or brightness of each light source in the backlight module, according to the representative color and/or brightness of each image section; specifically, the control unit may comprises microcontroller unit (MCU) in a converter, and a driving unit (such as LED driver) controlled by the microcontroller unit. More preferably, the control unit controls the illumination colors and/or brightness of each light source in the backlight module by adjusting current. In other words, when the light sources are driven by current (e.g. LED), the control unit can control respective light sources by adjusting current.

Figure 1:
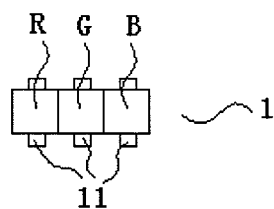
FIG. 1 is a schematic structural view of the light source in a backlight module according to Embodiment 1 of the present invention.
Figure 2:
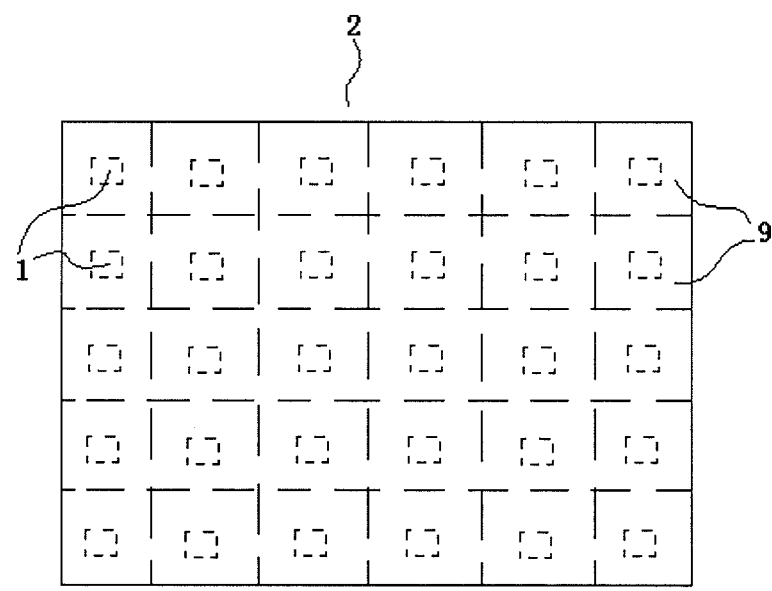
FIG. 2 is a schematic top view of the backlight module according to Embodiment 1 of the present invention.
Figure 3:
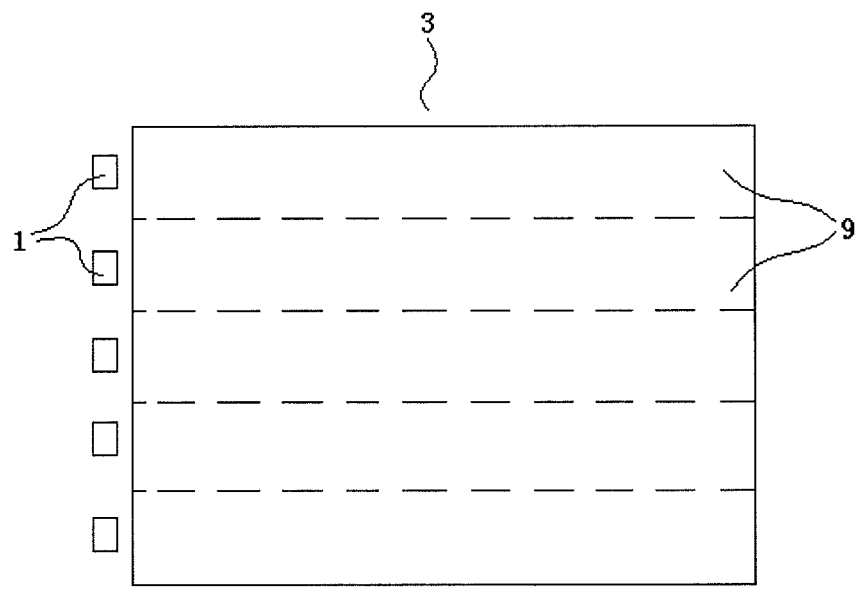
FIG. 3 is schematic top view of another backlight module according to Embodiment 1 of the present invention.

Hereinafter the backlight module to which the above light source control module is applicable will be described in detail. As shown in FIGS. 1-3, the backlight module of the present embodiment comprises a plurality of light sources 1 and above light source control module.

Each light source 1 has adjustable illumination color and brightness. The lights emitted from each light source 1 mainly output from certain area on the output surface of the backlight module, which area is called a light output area 9. That is, the output surface of the backlight module can be divided into a plurality of light output areas 9, and each light source 1 mainly illuminate one light output area 9 (of course, there is necessarily a little part of light emitted from the light source 1 output from other light output area 9, besides from the corresponding light output area 9). Preferably, the light output areas 9 of respective light sources 1 are adjacent but not overlapped.

Above light source control module is used for controlling illumination colors and brightness of each light source 1 independently.

Preferably, each light source 1 comprises a plurality of sub-sources emitting lights with different colors, the brightness of each sub-source is controlled independently by the light source control module.

A light source 1 consists of a plurality of sub-sources emitting lights with different colors, that is, the light emitted from the light source 1 is formed by combination of lights from the sub-sources, such that the illumination colors and brightness of the whole light source 1 can be controlled by adjusting the illumination brightness of the sub-sources respectively.

Preferably, as shown in FIG. 1, the sub-sources are LEDs, and each LED has independent lead pins 11.

Specifically, the light emitting diodes are common light sources in the backlight module for their low cost, low power consumption, small volume, simple structure and being easy to control. LED is preferably used as above sub-source, the pins 11 of respective light emitting diodes are independent from each other (i.e., each of the pins 11 is connected to a light emitting diode driver respectively), so that current in each light-emitting diode can be controlled independently, the illumination brightness can be controlled independently.

Preferably, each light source 1 comprises a red LED R, a green LED G and a blue LED B.

The light source 1 is formed by a red LED R, a green LED G and a blue LED B because lights with various colors can be formed by combination of red, green and blue lights, that is three primary colors in optical field.

Of course, above description is not intended to limit the light source 1 in a precise manner. Light source 1 may has other forms as long as the light output color and/or brightness can be controlled independently. For example, the light source 1 may be other components such as OLED, and the color combination may be red-green-blue-yellow and the like.

Specifically, the backlight module may have a variety of different forms, for example, preferably, as shown in FIG. 2, the backlight module may be direct-lit backlight module, the direct-lit backlight module includes a diffuser plate 3, the diffuser plate 3 has opposite incident surface and the output surface (top and bottom surfaces), and a plurality of light sources are disposed at different positions on the output surface of the diffuser plate 3, such that each of the light output areas 9 is a block area on the output surface corresponding to the respective light sources 1.

In the direct-lit backlight module, the light source 1 directly emits light onto the light output surface, such that light output areas 9 is a block area corresponding to the position of the light source 1. In a direct-lit backlight module, the light output areas 9 of each light source 1 is small such that the light output surface can be divided into more light output areas 9, the light output can be controlled more exactly and is therefore preferable.

A direct-lit backlight module may comprise other known components such as optical films, reflectors and the like, and detailed description thereof is omitted here.

As another form of the present embodiment, as shown in FIG. 3, the backlight module may be an edge-lit backlight module. The edge-lit backlight module comprises a light guide plate 2 having opposite light output surface and back surface (top and bottom surfaces), and side surfaces connected between the light output surface and back surface. A plurality of light sources 1 are point light source (such as LEDs mentioned above) and disposed at different positions outside the side surface of the light guide plate 2, the light output areas 9 are the strip-like areas on the light output surface corresponding to the positions of the light sources 1.

In the edge-lit backlight module, lights emitted from a light source 1 is incident on the side surface of the light guide plate 2, and outputs from the output surface after being reflected, therefore the light output area 9 of a light source 1 is a strip-like area at its position.

Although in the edge-lit backlight module, lights emitted from the respective light sources 1 may have more portions enter the light output area 9 of other light sources 1, and the light output effect would be affected, the present invention can be applied with such configuration.

The edge-lit backlight module may comprise other known components such as optical films, reflectors and the like, and detailed description thereof is omitted here.

Figure 4:
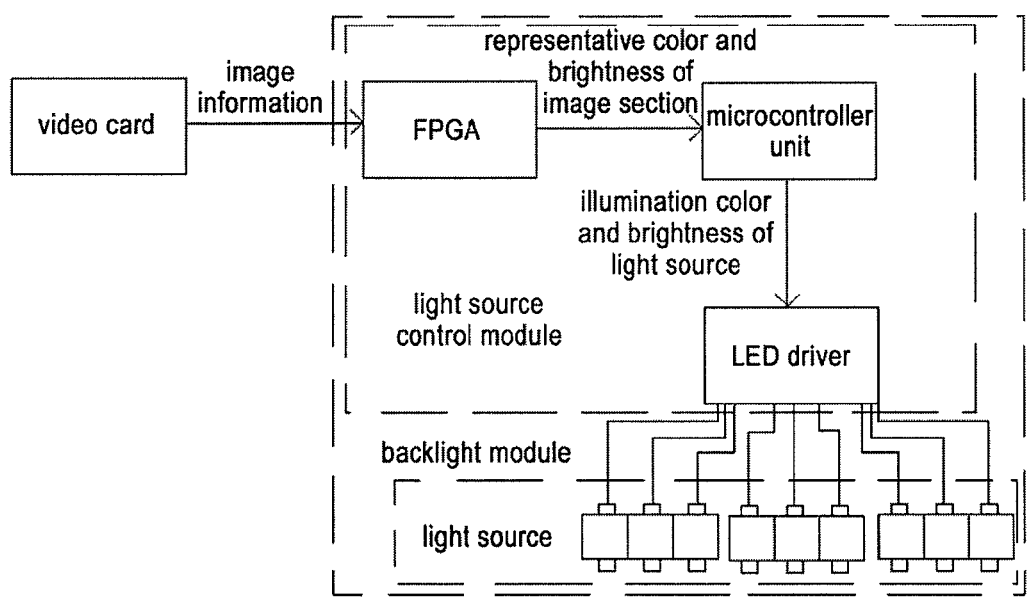
FIG. 4 is a schematic view of the driving structure of the backlight module according to Embodiment 1 of the present invention.
Figure 5:
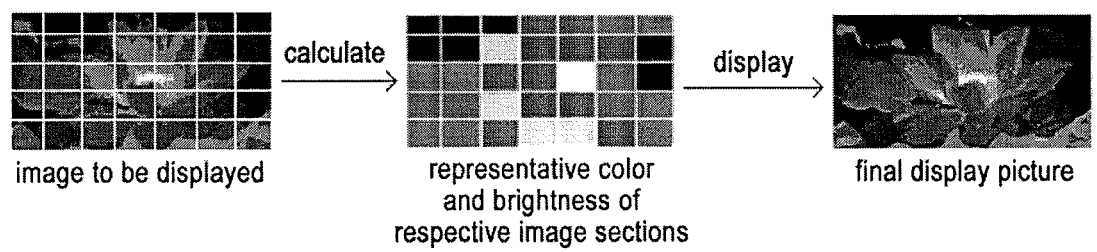
FIG. 5 is an effect view of the driving structure of the backlight module according to Embodiment 1 of the present invention.

As shown in FIGS. 4-5, the present embodiment provides a driving method of the above backlight module, the method comprises: calculating representative color and/or brightness of each image section based on image information, wherein each image section corresponds to a light output area on the output surface of the backlight module, each light output area is illuminated by one light source in the backlight module; and adjusting the illumination colors and/or brightness of each light source such that the color and/or brightness of each light output area is in conformity with the representative color and/or brightness of corresponding image section.

As shown in FIG. 5, in the driving method of the backlight module according to the present embodiment, an image is divided into a plurality of image sections, each image section corresponds to a light output area 9 of the backlight module, that is, when the image is displayed through the display panel, light emitted from each light output area 9 substantially illuminate an image section. Then, according to the original image information (colors and/or brightness of each point in the image to be displayed) from the display system (e.g. video card), the color and/or brightness of the respective image sections is calculated (i.e., to calculated the "whole content" of each section in the image, details will be described in the following). Subsequently, the respect light sources 1 can be adjusted to emit lights with desirable colors and/or brightness, such that the color and/or brightness of a light output area 9 corresponding to the light source 1 is in conformity with the representative color and/or brightness of corresponding image section. The display panel will then be driven to display under such illumination state and the final display picture is obtained.

As above, the method of the present embodiment actually established a matching relationship between the colors and/or brightness of lights illuminated onto different areas of the display panel and the contents of the image to be displayed at the area. In other words, said color and/or brightness of lights illuminated onto different areas of the display panel is the "representative" (or characteristic) color and/or brightness of one area in the image to be displayed. Such illumination lights, after being filtered by the display panel, may render the contents to be displayed at the area better, with increased color amount and improved color saturation. As shown in FIG. 5, compared to the situation wherein white illumination light is filtered, the final display picture has more natural colors, better performance and improved saturation.

Specifically, the above method comprises the following steps:

S01, display system (video card) sends the image information to the acquiring unit of the light source control unit, the acquiring unit sends the image information to the calculating unit (for example FPGA).

S02, the calculating unit calculating the initial value Lin of respective color component in each image section according to the following formula:

$$L_{in} = \frac{a}{P} \sum_{i=0}^{max} (i \times H_i \times W_i)$$

Wherein a is color coefficient, P is the number of pixels having the color component in each image section, i is a color value, Hi is the number of pixels having the color component and having a color value i in each image section, Wi is a weighting factor for the color value i.

It is known that each point in an image can be considered as being formed by "combination" of several colors with different brightness, and such colors to be combined are so-called "color components". Preferably, each color component corresponds to the color of one sub-source in a light source 1; that is, the color component and the sub-sources in a light source 1 may be defined accordingly. for example, if a light source 1 comprises a red LED R, a green LED G and a blue LED B, the color components can comprises red, green and blue. As such, after calculating the value of each color component, the sub-source of corresponding color can be caused to emit lights with required brightness, thus the calculation is simple.

The "initial value" and "color value", as well as the "enhanced value" to be described later of the color components in the present embodiment refer to certain "amount" of the respective color components, or how much is the color component, which can be denoted using brightness or other unit such as gray levels.

The above step is to calculate an "average amount" of each color component in the area (image section) according to the original contents of the image to be displayed. A sum of the respective "average amounts" is the representative color and/or brightness of the image section, which is the color and brightness of the lights to be emitted from the corresponding light output area 9.

Specifically, each image section has a plurality pixels with target color component (e.g. red), that is, red pixels, and the color value I of each pixel is different (i.e. the "amount" of red is different). Hi indicates the amount of pixels of certain color having a color value i (i.e. the amount of pixels having a red "amount" of i). Σ (i×Hi) indicates a sum of the color value of the color component in the corresponding image section (that is, a "sum" of red); by dividing the obtained value by P, the "average amount" of the color component in the image area (i.e. the average amount of red) can be obtained.

The final display picture will be distorted if using the "average amount" as the representative color and brightness of an image section, therefore the "average amount" should be adjusted, for which reason a weighting factor Wi and a color coefficient a are introduced. These two coefficients may be preset and adjusted based on experience, wherein different color value i have different weighting factor Wi, which means the weights of different color value i are different. Generally, a color value i close to an intermediate brightness has larger weight Wi, and color values i with very high or very low brightness have low weight Wi. The color coefficient a is used for further adjusting the calculated "average amount" (for example increase or reduce as a whole), to adapt various situations.

As shown in FIG. 5, through above calculation, the values of the color components in the image sections, i.e. the "representative" color and brightness of the respective areas in the image can be obtained, which is similar to a mosaic processing to the image.

It should be noted that, above mentioned method is only a preferable one for calculating the representative color and brightness of image sections, other approaches may also be adopted for calculating the representative color and brightness. In the present embodiment, the initial value of each color component can be directly used to obtain the representative color and brightness of the respective image sections. More preferably, the following processing may be performed for achieving better display effect.

S03, preferably, after the initial value Lin is obtained, it can be enhanced to obtained the enhanced value Lz for each color component in the image sections, the enhanced value Lz is calculated as follows:

$$L_z = \begin{cases} L_{in} & L_{in} \leq L_m \\ L_{in} + b \times (L_{in} - L_m) & L_{in} > L_m \end{cases}$$

Wherein b is the enhancement coefficient, Lm is an average of the initial value Lin of the color component in all image sections.

Using the driving method according to the present embodiment, when the image brightness is low in whole, if the brightness of an area is higher, then in visual effects, the brightness of the area appears lower than its actual brightness, causing display distortion. Thus, such area can be enhanced to make the brightness of lights emitted from this area higher than that from other areas. Above formula may be adopted, wherein b is coefficient based on experience (and apparently positive) for adjusting the extent of enhancement.

In the present embodiment, the above enhanced value of each color component can be used to obtain the representative color and brightness of the respective image sections. More preferably, the following processing may be performed for achieving better display effect.

S04, preferably, the representative color and/or brightness of respective image section is compared with that of adjacent image section, and the representative color and/or brightness of the image section is adjusted based on comparison result.

As mentioned above, due to the diffusion effect of light, lights emitted from a light source 1 cannot be strictly limited in a corresponding light output area 9, certain part of the lights will enter the neighboring light output areas 9. If the difference in color and/or brightness of two adjacent image sections is very large, the light source 1 for an image section (or for a light output area 9) will affect the neighboring light output area 9 significantly, causing distortion in neighboring image sections. For this, the representative color and/or brightness of adjacent image sections can be compared, and the representative color and/or brightness of the image sections shall be adjusted based on comparison result. For example, if the brightness difference between two adjacent image sections exceeds a preset threshold, the brightness of the brighter image section may be lowered to make the brightness difference lower than the threshold, so as to eliminate or alleviate the affection of the brighter image section to the neighboring sections.

Above processing may be regarded as a "spatial filtering" for the representative color and/or brightness of the image sections, so as to make the representative color and/or brightness of the image sections change smoothly in space.

S05, preferably, the representative color and/or brightness of respective image section is compared with that of the same image section in adjacent image frames, and the representative color and/or brightness of the image section is adjusted based on comparison result.

During display, if the difference between the representative color and/or brightness of an image section in two successive images is very large, then the difference in the color and/or brightness of lights emitted from the corresponding light source 1 will be large. As above, such difference will affect the neighboring image sections, cause blinking in the other image sections and affect display effect. Thus, the color and/or brightness of a same image section in adjacent frames are compared, and the representative color and/or brightness of the image section can be adjusted based on comparison result. For example, if the brightness difference between two adjacent frames exceeds a preset threshold, the brightness in the brighter frame may be lowered to make the brightness difference lower than the threshold, so as to eliminate or alleviate the blinking defect.

Above processing may be regarded as a "time filtering" for the representative color and/or brightness of the respective image sections, so as to make the representative color and/or brightness of the image sections change smoothly in time.

S06, the representative color and/or brightness of the respective image sections calculated above is sent by the FPGA to the microcontroller unit of the converter, the LED driver is controlled by the microcontroller unit to adjust current through each LED, so as to make each light source 1 emit lights having required color and/or brightness.

In other words, the illumination color and/or brightness of each light source 1 is adjusted according to the representative color and/or brightness of the respective image section corresponding to each light output area 9 in the image to be displayed, such that the color and/or brightness of the light output area 9 corresponding to each light source 1 can be altered.

S07, the LCD display panel is driven to display so as to provide the final display picture.

At this time, since the backlight module according to the present embodiment does not emit uniform white light, driving of the display panel should be adapted to the backlight module of the present invention, so as to provide pictures with improved color performance and enhanced color saturation. Based on the representative color and/or brightness of the respective image section calculated using the above backlight module driving method, the driving voltage for subpixels of certain color in an area of the display panel may be adjusted as a whole, thus the optimized local illumination color and brightness provided by the backlight module of the invention can be utilized sufficiently. For example, if in lights from a light output area 9, red component is predominant, when the display panel is driven, the gray level voltage for red pixels in the panel corresponding to this area shall be reduced appropriately, such that the red component in the lights emitted from the light output area 9 can transmit as much as possible, so as to provide optimal color performance.

Embodiment 2

The present embodiment provides a display device comprising above backlight module. The display device also comprise other known components such as display panel, case and power supply, the detailed description there of is omitted here.

The backlight module of the present invention is applicable to any display device using backlight, such as LCD panel, E-paper, mobile phone, tablet PC, TV set, monitor, laptop computer, digital photo frame, navigator, MEMS system and like product or component having a display function.

It is apparent that the embodiments described herein are merely illustrative for describing the principle of the present invention, the present invention is not limited hereto. For persons skilled in the art, various modifications and improvement can be proposed without departing from spirit and substance of the present invention, and such modifications and improvement drop within the protection scope of the present invention.

The invention claimed is:

1. A light source control module, wherein the light source control module is configured for separately controlling illumination colors and/or brightness of each light source in a backlight module according to image information, each of the light sources comprises a plurality of sub-sources with different luminescent colors; the light source control module comprising:
   an acquiring unit for acquiring image information;
   a calculating unit, configured to calculate representative color and/or brightness of each image section based on the image information;
   a control unit for controlling the illumination colors and/or brightness of each light source in the backlight module, according to the representative color and/or brightness of each image section; and
   wherein the calculating unit calculates, according to the following formula, an initial value Lin of respective color component in each image section:

$$L_{in} = \frac{a}{P} \sum_{i=0}^{max} (i \times H_i \times W_i)$$

wherein a is color coefficient, P is the number of pixels having the color component in each image section, i is a color value, Hi is the number of pixels having the color component and having a color value i in each image section, Wi is a weighting factor for the color value i.

2. The light source control module according to claim 1, wherein the control unit controls the illumination colors and/or brightness of each light source in the backlight module by adjusting current.

3. A backlight module comprising:
   a plurality of light sources, the illumination color and/or brightness of each light source is adjustable; and
   the light source control module according to claim 1.

4. The backlight module according to claim 3, wherein each of the light sources comprises a plurality of sub-sources having different luminescent colors.

5. The backlight module according to claim 4, wherein the sub-sources are light emitting diodes.

6. A driving method of backlight module, comprising:
   calculating representative color and/or brightness of each image section based on image information, wherein each image section corresponds to a light output area on the output surface of the backlight module, each light output area is illuminated by one light source in the backlight module, and wherein an initial value Lin of respective color component in each image section is calculated according to the following formula:

$$L_{in} = \frac{a}{P} \sum_{i=0}^{max} (i \times H_i \times W_i)$$

wherein a is color coefficient, P is the number of pixels having the color component in each image section, i is a color value, Hi is the number of pixels having the color component and having a color value i in each image section, Wi is a weighting factor for the color value i; and
   adjusting the illumination colors and/or brightness of each light source such that the color and/or brightness of each light output area is in conformity with the representative color and/or brightness of corresponding image section.

7. The driving method of backlight module according to claim 6, wherein said calculating representative color and/or brightness of each image section based on image information comprise:
   obtaining an enhanced value Lz of respective color component in each image section by enhancing the initial value Lin, wherein the enhanced value Lz is calculated as follows:

$$L_z = \begin{cases} L_{in} & L_{in} \leq L_m \\ L_{in} + b \times (L_{in} - L_m) & L_{in} > L_m \end{cases}$$

wherein b is enhancement coefficient, Lm is an average of the initial value Lin of the color component in all image sections.

8. The driving method of backlight module according to claim 7, wherein said calculating representative color and/or brightness of each image section based on image information comprise:
   comparing the representative color and/or brightness of respective image section with that of adjacent image section, and adjusting the representative color and/or brightness of the image section based on comparison result.

9. The driving method of backlight module according to claim 7, wherein said calculating representative color and/or brightness of each image section based on image information comprise:
comparing the representative color and/or brightness of respective image section with that of the same image section in adjacent image frames, and adjusting the representative color and/or brightness of the image section based on comparison result.

10. The driving method of backlight module according to claim 6, wherein the color of each sub-source is adjusted according to the calculated color component.

11. The driving method of backlight module according to claim 10, wherein said calculating representative color and/or brightness of each image section based on image information comprise:
comparing the representative color and/or brightness of respective image section with that of adjacent image section, and adjusting the representative color and/or brightness of the image section based on comparison result.

12. The driving method of backlight module according to claim 10, wherein said calculating representative color and/or brightness of each image section based on image information comprise:
comparing the representative color and/or brightness of respective image section with that of the same image section in adjacent image frames, and adjusting the representative color and/or brightness of the image section based on comparison result.

13. The driving method of backlight module according to claim 6, wherein said calculating representative color and/or brightness of each image section based on image information comprise:
comparing the representative color and/or brightness of respective image section with that of adjacent image section, and adjusting the representative color and/or brightness of the image section based on comparison result.

14. The driving method of backlight module according to claim 6, wherein said calculating representative color and/or brightness of each image section based on image information comprise:
comparing the representative color and/or brightness of respective image section with that of adjacent image section, and adjusting the representative color and/or brightness of the image section based on comparison result.

15. The driving method of backlight module according to claim 6, wherein said calculating representative color and/or brightness of each image section based on image information comprise:
comparing the representative color and/or brightness of respective image section with that of the same image section in adjacent image frames, and adjusting the representative color and/or brightness of the image section based on comparison result.

16. The driving method of backlight module according to claim 6, wherein said calculating representative color and/or brightness of each image section based on image information comprise:
comparing the representative color and/or brightness of respective image section with that of the same image section in adjacent image frames, and adjusting the representative color and/or brightness of the image section based on comparison result.

* * * * *